KUAN-HAN SUN
MAURICE L. HUGGINS
*INVENTORS*

Patented June 13, 1950

2,511,224

UNITED STATES PATENT OFFICE 2,511,224

FLUORIDE GLASS

Kuan-Han Sun and Maurice L. Huggins, Rochester, N. Y., assignors to Eastman Kodak Company, Rochester, N. Y., a corporation of New Jersey Application December 15, 1944, Serial No. 568,314

11 Claims. (Cl. 106—47)

The present invention relates to inorganic vitreous substances or glasses, to batches from which they are made and to methods of producing them. In particular, these glasses have unique and extremely desirable optical properties.

Chemically, glasses may be classified as oxide-, fluoride-, chloride-, sulfide-types, other types containing only one electro-negative element, and mixed types. Oxide-glasses, which include silicates, borates, phosphates, germanates, etc., are by far the most abundant and dominant type. The present invention is concerned only with pure fluoride glasses and with fluoride glasses containing only small amounts of oxides, chlorides, etc.

Optically, the present invention is concerned with the unusual refracting properties of the new glasses—particularly with their low dispersion or high Abbé value ($\nu$), especially desirable partial dispersion ratios, and low refractive index for the sodium D-line ($n_D$)—and with light transmission—particularly in the ultraviolet and visible regions.

In general, fluorides have very low optical dispersions and high Abbé values. At present, only crystalline lithium fluoride is available in relatively large sizes. Relatively large calcium fluoride crystals have been made with great difficulty. These fluorides have Abbé values greater than 95. Crystalline calcium fluoride, in particular, has very high blue partial dispersion ratios and very low red partial dispersion ratios relative to its Abbé value, these properties making it highly valuable for the correction of the secondary spectrum in optical lens design. One object of this invention is to make glasses having Abbé values greater than 95 and desirable partial dispersion ratios (i. e., better, with respect to these properties, than crystalline lithium and calcium fluorides). Another object is to make glasses with a refractive index considerably lower than those of any glasses known to us to be available. Another object is to make glasses whose Abbé values range from over 100 down to the values characteristic of ordinary glasses, with refractive indices ($n_D$) ranging from 1.34 to those of ordinary glasses, with partial dispersion ratios at the blue end of the visible spectrum $$\left(\text{e. g., } \nu_{gF}=\frac{n_g-n_F}{n_F-n_C}\right)$$

abnormally high, and with those at the red end $$\left(\text{e. g. } \nu_{FA'}=\frac{n_F-n_{A'}}{n_F-n_C}\right)$$

abnormally low for a given $\nu$ value.

Reference will be made to the accompanying drawings in the form of diagrams or charts used to illustrate and explain the novel and desirable properties of our new fluoride glasses.

There are three relationships between the optical constants of a glass that are especially important to optical designers.

Figure 1:
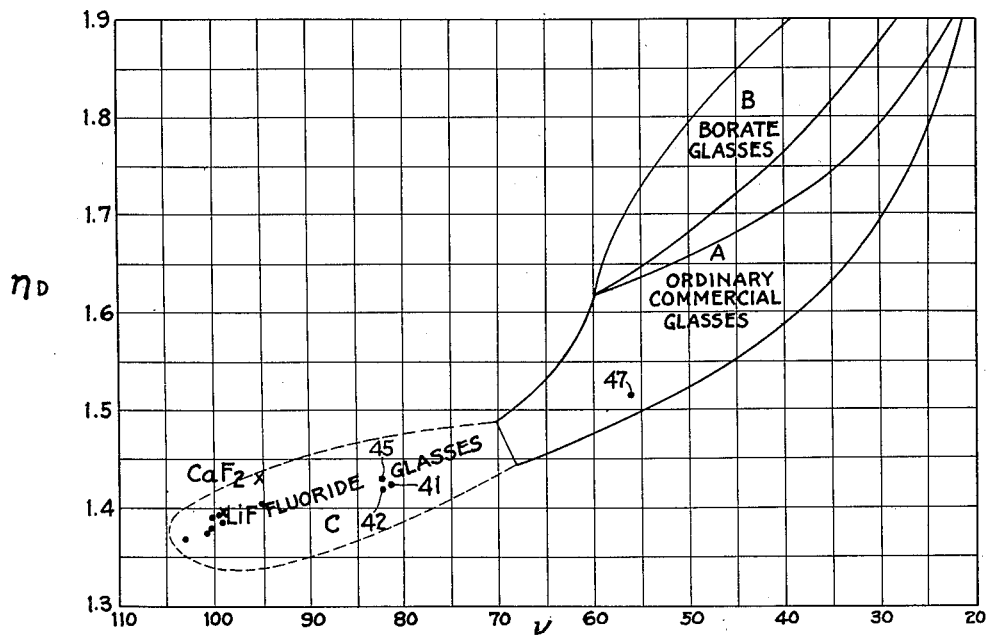
Figure 1 is a chart, the coordinates of which are $\nu$ and $n_D$, showing the areas of these values both for previously known glasses and for our new glasses.

The first of these is the relationship between the $n_D$ and $\nu$ values. $n_D$ is the refractive index for the sodium D-line and $\nu$ is defined as $$\frac{n_D-1}{n_F-n_C}$$

where $n_F$ and $n_C$ are the refractive indices for the F- and C-lines respectively. In Figure 1, $n_D$ is plotted against $\nu$. Optical designers would like to have glasses with properties represented by points scattered all over the chart so that they might choose two or more glasses, for use together, having any desired combination of optical properties. In practice, however, the availability of glasses, with respect to their $n_D$ and $\nu$ values, is rather limited. In Figure 1, the area A labelled "Ordinary commercial glasses" includes, we believe, all glasses used in optical designs up to about 1939. The introduction of borate glasses—particularly those also containing rare-elements, described by G. W. Morey in U. S. Reissue Patent No. 21,175, greatly extended the area of available glasses, as shown approximately in the area B in the chart designated "Borate glasses." The present invention extends the area representing available glasses further into the region of very high $\nu$ value or low dispersion. The area C marked "Fluoride glasses" includes the approximate region which we believe will be covered by our fluoride glasses, of the types described in this patent, after the measurements of the $\nu$ values have been completed.

The particular values for certain examples are designated on the charts by dots and the corresponding example numbers and the values for crystalline lithium and calcium fluorides are also indicated by $x$ and the formula. It is further to be understood that area C extends into and overlaps a part of area A as is evident from Example 47. In connection with these data and with the data given in Table X, later in this specification, we wish to point out that, while complete data on all of the glasses described are not yet available, the measurements already made warrant us in making with assurance the general statements as to optical properties appearing herein and forming the basis of the accompanying charts. It is also to be understood that the areas A, B and C are approximate, and are intended merely to show graphically the general fields of interest.

Figure 2:
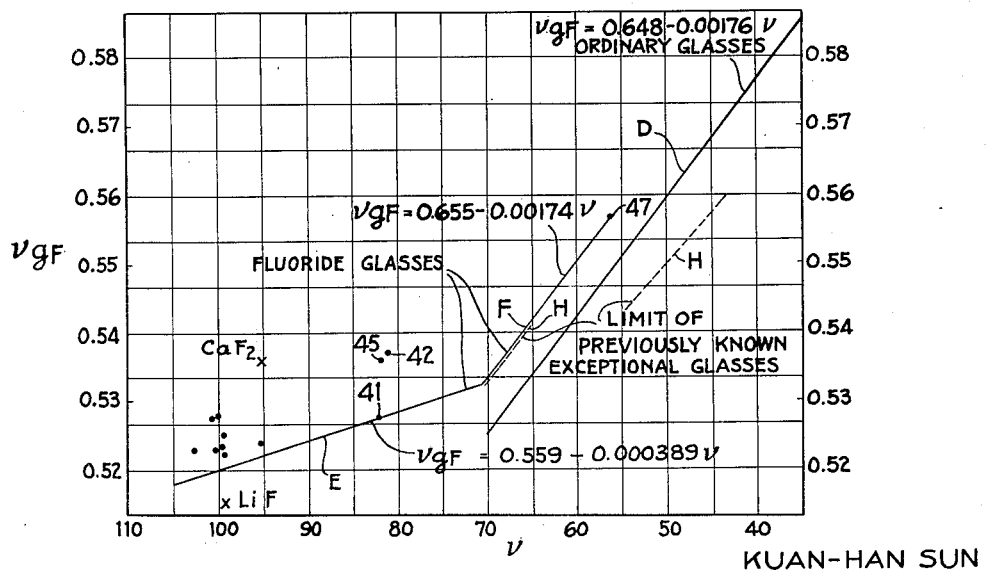
Figure 2 is a chart, the coordinates of which are $\nu$ and $\nu_{gF}$, illustrating the relation between these values found in our novel glasses.
Figure 3:
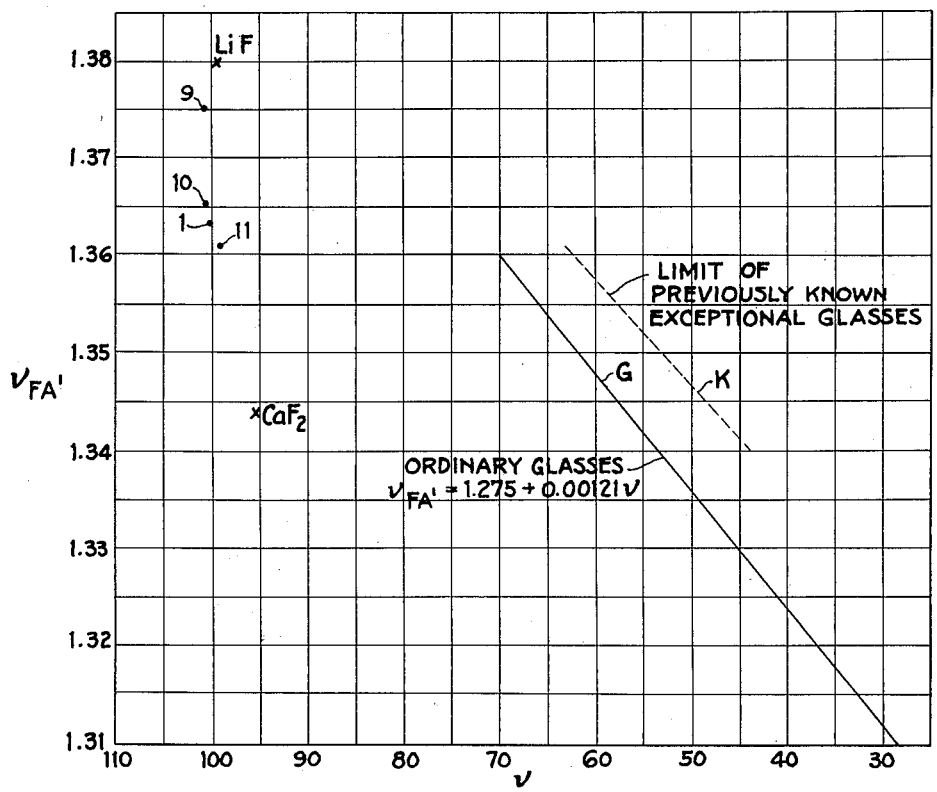
Figure 3 is a chart, the coordinates of which are $\nu$ and $\nu_{FA'}$, showing the relation between these values found in our novel glasses.
Figure 4:
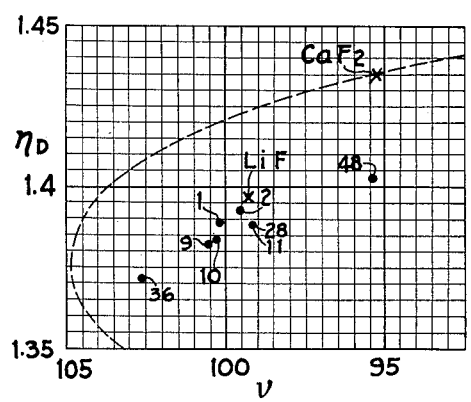
Figures 4 and 5 are enlarged portions of Figures 1 and 2 respectively.
Figure 5:
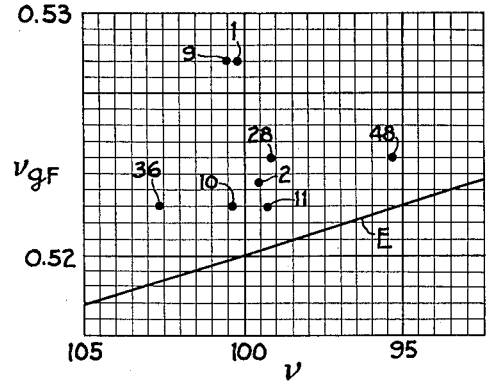

The second and third relationships of great importance to optical designers are those between $\nu_{gF}$ and $\nu$ and between $\nu_{FA'}$ and $\nu$ values. $\nu_{gF}$ and $\nu_{FA'}$, the partial dispersion ratios, may be defined as $$\frac{n_g - n_F}{n_F - n_C}$$

and $$\frac{n_F - n_{A'}}{n_F - n_C}$$

respectively. These measure the curvature of the dispersion curve, near the blue and red ends of the spectrum respectively. (In place of $g$ and $A'$, other lines in these regions might be used.) It can be shown that in order to correct a doublet lens for three colors, the two glasses chosen must have widely differing $\nu$ values, with differences in $\nu_{gF}$ or $\nu_{FA'}$ as small as possible. To achieve this it would be advantageous to have glasses with properties represented by points scattered all over the $\nu_{gF}$ vs. $\nu$ and $\nu_{FA'}$ vs. $\nu$ charts. Unfortunately most glasses lie on or very close to a straight line D or G as shown in Figures 2 and 3. Approximate limits for previously available exceptional glasses are indicated by dashed lines. The properties of certain of our fluoride glasses are indicated by dots in Figures 2 and 3. Their superiority in this respect is indicated by the fact that these points depart considerably from the straight lines representing all known commercial glasses.

In the examples hereinafter given, $\nu_{gF}$ is equal to or greater than $(0.655 - 0.001743\nu)$, line F in Figure 2, for a value less than 70 and equal to or greater than $(0.559 - 0.000389\nu)$, line E of Figure 2, for a $\nu$ value greater than 70. For ordinary glasses, $\nu_{gF}$ is about $(0.648 - 0.00176\nu)$, line D, the $\nu$ values for such known glasses lying between 35 and 70. Extrapolating from this formula, $\nu_{gF}$ would equal 0.472 if $\nu$ were 100.2. However, the corresponding $\nu_{gF}$ value for our Example 1 which has this $\nu$ value is 0.528. From the optical designer's point of view, this increase over 0.472 is quite advantageous. Similarly $\nu_{FA'}$ for ordinary glasses may be calculated from the relation $(1.275 + 0.00121\nu)$. For a $\nu$ value of 100.4 this would give a $\nu_{FA'}$ value of 1.396. The $\nu_{FA'}$ of our Example 10 having this $\nu$ value is 1.366. An abnormally low value, such as this, makes a glass especially useful for optical systems.

Referring again to Figure 2, the line D indicates the $\nu_{gF}$ vs. $\nu$ relation for ordinary glasses according to the equation mentioned and the line E—F indicates the lower limit of the same relation for our new glasses having a $\nu$ value respectively above and below 70 according to the equations mentioned. Approximate limits for exceptional previously known glasses are indicated by dotted lines H in this figure.

In Figure 3, the line G indicates the $\nu_{FA'}$ vs. $\nu$ relation for ordinary glasses, the dotted line K indicating the limit for exceptional previously known glasses. The position of these values for certain specific examples of our new glasses and for lithium and calcium fluorides are indicated.

In both of these figures the superiority of these glasses is indicated by the amount by which these points are spaced from the lines representing previously available glasses.

It may be noted here that lithium fluoride is not very durable against moisture attack, also that large calcium fluoride crystals cannot be polished by ordinary means. It may also be noted that the highest Abbé value of all commercially available glasses known to us is about 70, and the lowest refractive index is about 1.46.

In general, fluorides are known to transmit ultraviolet radiation better than oxides. It is another object of this invention to make glasses more transparent to short wavelength ultraviolet radiation than are oxide-glasses.

References to fluoride glasses are found in V. M. Goldschmidt, Vid. Akad. Skv., Oslo, 1926, No. 8, p. 138; and G. Heyne, Angew. Chem., 46, p. 473, 1933. However, these glasses were water-soluble and hygroscopic. It is another object of this invention to provide fluoride glasses which are, for practical purposes, stable against moisture attack. A common durability test for optical glasses is to leave the polished sample in a humidifier for eight days at 71° C. and approximately 60 per cent humidity. The glass is considered satisfactory if only a slight visible stain is produced during this test.

Another test for optical glasses is the plant washing test, in which the polished glass is coated with shellac and baked for one hour at 110° C. The shellac is next removed by soaking in ethanol. The glass is then washed with hot trisodium phosphate solution and rinsed with hot water. A satisfactory glass will not show stain under such a treatment. A glass that will pass either of these tests we define as "moisture-insusceptible."

The chief "glass-forming" component in our fluoride-glasses is beryllium fluoride. This compound itself may easily be obtained as a glass under ordinary conditions, with a refractive index about 1.28. Unfortunately, it is very hygroscopic. In order to "stabilize" the glass against moisture attack, other fluorides are compounded with the beryllium fluoride. The objects of this invention, as expressed above, are attained by making moisture-resisting glasses which contain: (first) the least possible amount of beryllium fluoride, usually with aluminum fluoride; (second) little or no alkali metal fluorides, LiF, NaF, KF, RbF, and CsF, which are relatively soluble; (third) relatively insoluble fluorides such as $MgF_2$, $CaF_2$, $SrF_2$, $BaF_2$, $PbF_2$, $YF_3$, $LaF_3$, $PrF_3$, $NdF_3$, $SmF_3$, $BiF_3$, $InF_3$, $GaF_3$, $CeF_4$ (or $CeF_3$) and $ThF_4$; and (fourth) other compatible components such as insoluble phosphates, sulfates, etc., in addition to the main fluoride-components. The fluorides of the divalent metals mentioned have a solubility of less than 0.16 part by weight in 100 parts of solution at 20° C., and the other polyvalent fluorides mentioned are all insoluble or only slightly soluble in water, and by the term "insoluble" we intend to include such slight solubility.

As illustrative of our invention, consecutively numbered examples are given, assembled for convenience of comparison in nine tables. All the compositions are given on the basis of anhydrous components of the batch. In each example the weight percentages are given in a column under the letter W, and in most of the examples the corresponding mole percentages are given in a column on the right under the letter M. The $n_D$ value is also given for most of the examples.

TABLE I

|  | 1 | | 2 | | 3 | | 4 | | 5 | |
|---|---|---|---|---|---|---|---|---|---|---|
|  | W | M | W | M | W | M | W | M | W | M |
| MfF$_2$ | 12 | 15.4 | 13 | 16.8 | 12 | 15.8 | 12 | 14.7 | 12 | 14.0 |
| CaF$_2$ | 15 | 15.4 | 14 | 14.4 | 14 | 14.8 | 13 | 12.7 | 12 | 11.2 |
| SrF$_2$ | 8 | 5.1 | 8 | 5.1 | 9 | 5.9 | 7 | 4.3 | 12 | 7.0 |
| BaF$_2$ | 10 | 4.6 | 10 | 4.6 | 10 | 4.7 | 8 | 3.5 | 12 | 5.0 |
| LaF$_3$ | 10 | 4.1 | 10 | 4.1 | 11 | 4.6 | 8 | 3.1 | 12 | 4.4 |
| AlF$_3$ | 28 | 26.7 | 29.5 | 27.9 | 30 | 29.5 | 32 | 29.1 | 5 | 4.3 |
| BeF$_2$ | 17 | 29.0 | 15.5 | 27.3 | 14 | 24.6 | 20 | 32.6 | 35 | 54.1 |
| $n_D$ | 1.3892 | | 1.3924 | | 1.396 | | 1.3744 | | | |

TABLE II

|  | 6 | | 7 | | 8 | |
|---|---|---|---|---|---|---|
|  | W | M | W | M | W | M |
| NgF$_2$ | 13 | 16.5 | 10 | 14.2 | 6.1 | 9.8 |
| CaF$_2$ | 14 | 14.2 | 10 | 11.3 | 8.2 | 10.5 |
| SrF$_2$ | 8 | 5.1 | 10 | 7.1 | 5.1 | 4.1 |
| BaF$_2$ | 12 | 5.4 | 10 | 5.1 | 9.2 | 5.2 |
| LaF$_3$ | 5 | 2.0 | 16 | 7.2 | 8.2 | 4.2 |
| ThF$_4$ | 6 | 1.6 | 7 | 2.0 | 28.6 | 10.8 |
| AlF$_3$ | 21 | 19.8 | 20 | 20.2 | 19.4 | 23.1 |
| BeF$_2$ | 21 | 35.4 | 17 | 32.1 | 15.3 | 32.6 |
| $n_D$ | 1.3844 | | 1.4008 | | 1.4129 | |

TABLE III

|  | 9 | | 10 | | 11 | | 12 | | 13 | | 14 | | 15 | | 16 | | 17 | | 18 | |
|---|---|---|---|---|---|---|---|---|---|---|---|---|---|---|---|---|---|---|---|---|
|  | W | M | W | M | W | M | W | M | W | M | W | M | W | M | W | M | W | M | W | M |
| MgF$_2$ | 12 | 15.4 | 12 | 15.5 | 12 | 15.6 | 12 | 15.6 | 13 | 15.8 | 11.1 | 14.1 | 12.5 | 15 | 11.6 | 16.7 | 9.8 | 16 | 10 | 14.3 |
| CaF$_2$ | 13 | 13.3 | 13 | 13.4 | 13 | 13.5 | 8 | 8.3 | 18 | 17.5 | 12.1 | 12.3 | 26.2 | 25 | 1.9 | 2.2 | 1.6 | 2 | 10 | 11.4 |
| SrF$_2$ | 8 | 5.1 | 8 | 5.1 | 8 | 5.2 | 11 | 7.1 | 5 | 3.0 | 7.5 | 4.7 | 1.7 | 1 | 31.2 | 22.2 | 2.5 | 2 | 10 | 7.1 |
| BaF$_2$ | 11 | 5.0 | 11 | 5.0 | 11 | 5.1 | 12 | 5.6 | 5 | 2.2 | 10.3 | 4.6 | 2.4 | 1 | 4.3 | 2.2 | 38.6 | 22 | 10 | 5.1 |
| LaF$_3$ | 5 | 2.0 | 5 | 2.1 | 5 | 2.1 | 5 | 2.1 | 4 | 1.5 | 4.6 | 1.9 | 2.6 | 1 | 4.8 | 2.2 | 3.9 | 2 | --- | --- |
| CeF$_4$ | 4 | 1.5 | 4 | 1.5 | 4 | 1.5 | 4 | 1.5 | 4 | 1.5 | 3.8 | 1.4 | 4.4 | 1.5 | 4.0 | 1.7 | 2.2 | 1 | 16 | 6.6 |
| ThF$_4$ | 5 | 1.3 | 5 | 1.3 | 5 | 1.3 | 5 | 1.3 | 6 | 1.5 | 4.6 | 1.2 | 6.2 | 1.5 | 5.7 | 1.7 | 6.2 | 2 | 7 | 2.0 |
| AlF$_3$ | 20 | 19.0 | 21 | 20.2 | 22 | 21.3 | 21 | 20.3 | 22 | 19.9 | 24.1 | 22.7 | 22.5 | 20 | 21.9 | 23.3 | 23.5 | 28 | 20 | 21.2 |
| BeF$_2$ | 22 | 37.4 | 21 | 35.9 | 20 | 34.5 | 22 | 38.0 | 23 | 37.1 | 22.0 | 37.1 | 21.5 | 34 | 14.6 | 27.8 | 11.7 | 25 | 17 | 32.3 |
| $n_D$ | 1.3822 | | 1.3838 | | 1.3875 | | --- | --- | --- | --- | 1.3799 | | 1.3808 | | 1.3975 | | 1.4134 | | 1.4008 | |

TABLE IV

|  | 19 | | 20 | | 21 | | 22 | | 23 | | 24 | |
|---|---|---|---|---|---|---|---|---|---|---|---|---|
|  | W | M | W | M | W | M | W | M | W | M | W | M |
| MgF$_2$ | 7 | 10.1 | 7 | 11.3 | 10 | 12.8 | 9.9 | 12.7 | 9.0 | 12 | 10.0 | 13 |
| CaF$_2$ | 9 | 10.4 | 8 | 10.3 | 13 | 13.3 | 12.4 | 12.6 | 10.2 | 12 | 9.6 | 10 |
| SrF$_2$ | 5 | 3.6 | 5 | 4.0 | 7 | 4.5 | 6.6 | 4.2 | 6.0 | 4 | 3.1 | 2 |
| BaF$_2$ | 15 | 7.7 | 10 | 5.7 | 9 | 4.1 | 8.3 | 3.8 | 8.5 | 4 | 4.3 | 2 |
| PbF$_2$ | 26 | 9.6 | 30 | 12.3 | 9 | 2.9 | 8.7 | 2.8 | 8.8 | 3 | 9.1 | 3 |
| LaF$_3$ | --- | --- | 8 | 4.1 | 9 | 3.7 | 8.3 | 3.4 | 9.4 | 4 | 4.8 | 2 |
| CeF$_4$ | --- | --- | --- | --- | --- | --- | --- | --- | --- | --- | 5.3 | 2 |
| ThF$_4$ | --- | --- | --- | --- | --- | --- | --- | --- | 7.4 | 2 | 7.6 | 2 |
| AlF$_3$ | 17 | 18.3 | 17 | 20.3 | 17 | 16.2 | 23.1 | 21.9 | 15.1 | 15 | 20.7 | 20 |
| BeF$_2$ | 21 | 40.3 | 15 | 32.0 | 25 | 42.5 | 22.8 | 38.6 | 24.8 | 44 | 25.5 | 44 |
| $n_D$ | 1.416 | | 1.4394 | | | | 1.3855 | | 1.3937 | | 1.3820 | |

TABLE V

|  | 25 | | 26 | | 27 | | 28 | | 29 | |
|---|---|---|---|---|---|---|---|---|---|---|
|  | W | M | W | M | W | M | W | M | W | M |
| MgF$_2$ | 11 | 14.1 | 10 | 13.8 | 10 | 13.8 | 10 | 13.8 | 12 | 15.3 |
| CaF$_2$ | 9 | 9.2 | 8 | 8.8 | 8 | 8.8 | 8 | 8.8 | 13 | 13.2 |
| SrF$_2$ | 10 | 6.4 | 9 | 6.2 | 9 | 6.2 | 9 | 6.2 | 8 | 5.1 |
| BaF$_2$ | 12 | 5.5 | 12 | 5.9 | 12 | 5.9 | 12 | 5.9 | 12 | 5.4 |
| LaF$_3$ | | | | | | | | | 4 | 1.6 |
| YF$_3$ | 9 | 4.9 | | | | | | | | |
| PrF$_3$ | | | 16 | 7.0 | | | | | | |
| NdF$_3$ | | | | | 16 | 6.8 | | | | |
| SmF$_3$ | | | | | | | 16 | 6.7 | | |
| BiF$_3$ | | | | | | | | | 10 | 3.0 |
| ThF$_4$ | 5 | 1.3 | 5 | 1.4 | 5 | 1.4 | 5 | 1.4 | | |
| AlF$_3$ | 22 | 21.0 | 20 | 20.4 | 20 | 20.4 | 20 | 20.5 | 17 | 16.0 |
| BeF$_2$ | 22 | 37.6 | 20 | 36.5 | 20 | 36.6 | 20 | 36.6 | 24 | 40.4 |
| $n_D$ | 1.3759 | | 1.3909 | | 1.3902 | | 1.3879 | | 1.3881 | |

TABLE VI

|  | 30 | | 31 | | 32 | | 33 | | 34 | | 35 | | 36 | |
|---|---|---|---|---|---|---|---|---|---|---|---|---|---|---|
|  | W | M | W | M | W | M | W | M | W | M | W | M | W | M |
| MgF$_2$ | 15 | 21.1 | 13 | 15.7 | --- | --- | 13 | 17.0 | 15 | 19.0 | 14 | 17.8 | 13 | 15.4 |
| CaF$_2$ | | | 16 | 15.4 | 19 | 20.0 | --- | --- | 10 | 10.0 | 12 | 12.1 | 16 | 15.1 |
| SrF$_2$ | | | | | 10 | 6.6 | 13 | 8.4 | | | | | 10 | 5.9 |
| BaF$_2$ | 45 | 22.5 | | | 15 | 7.0 | 19 | 8.8 | 30 | 13.6 | 26 | 11.7 | | |
| LaF$_3$ | | | 20 | 7.8 | 10 | 4.2 | 9 | 3.7 | | | | | 11 | 4.1 |
| AlF$_3$ | 22 | 22.9 | 29 | 25.9 | 25 | 24.5 | 23 | 22.3 | 25 | 23.0 | 30 | 28.2 | 27 | 23.8 |
| BeF$_2$ | 18 | 33.5 | 22 | 35.2 | 21 | 36.8 | 23 | 39.8 | 20 | 34.0 | 18 | 30.2 | 23 | 36.0 |
| $n_D$ | 1.3930 | | 1.3732 | | 1.3905 | | 1.3789 | | 1.3809 | | 1.3815 | | 1.3718 | |

TABLE VII

|  | 37 | | 38 | | 39 | | 40 | |
|---|---|---|---|---|---|---|---|---|
|  | W | M | W | M | W | M | W | M |
| LiF | | | 5 | 12.9 | | | | |
| NaF | | | | | 9 | 14.5 | | |
| KF | 25 | 25.9 | | | | | 15 | 18.1 |
| CaF$_2$ | 5 | 3.9 | 10 | 8.6 | 11 | 9.6 | 10 | 9.0 |
| LaF$_3$ | 20 | 6.2 | 22 | 7.5 | 20 | 6.9 | 20 | 7.2 |
| AlF$_3$ | | | 30 | 24.0 | 28 | 22.6 | 25 | 20.9 |
| BeF$_2$ | 50 | 64.0 | 33 | 47.0 | 32 | 46.4 | 30 | 44.7 |
| $n_D$ | 1.345 | | 1.3592 | | 1.3534 | | 1.361 | |

2,511,224

TABLE VIII

|  | 41 | | 42 | | 43 | | 44 | | 45 | | 46 | | 47 | |
|---|---|---|---|---|---|---|---|---|---|---|---|---|---|---|
|  | W | M | W | M | W | M | W | M | W | M | W | M | W | M |
| $MgF_2$ | 9.2 | 12.5 | 8.7 | 12.2 | 8.1 | 12.3 | 10.8 | 14.6 | 8.6 | 11.9 | 6.8 | 10.5 | 5.8 | 9.7 |
| $CaF_2$ | 11.0 | 12.0 | 10.5 | 11.7 | 9.7 | 11.7 | 11.7 | 12.7 | 10.3 | 11.4 | 8.3 | 10.2 | 7.0 | 9.4 |
| $SrF_2$ | 7.3 | 4.9 | 7.0 | 4.9 | 6.5 | 4.9 | 7.2 | 4.8 | 6.9 | 4.7 | 5.5 | 4.2 | 4.7 | 3.8 |
| $BaF_2$ | 8.2 | 4.0 | 7.9 | 3.9 | 7.3 | 4.0 | 9.9 | 4.8 | 7.7 | 3.8 | 6.3 | 3.5 | 5.3 | 3.1 |
| $PbF_2$ | 9.2 | 3.1 | 10.5 | 3.8 | 9.7 | 3.7 | | | 8.6 | 3.0 | 8.3 | 3.3 | 7.0 | 3.0 |
| $LaF_3$ | 8.2 | 3.6 | 7.9 | 3.5 | 7.3 | 3.5 | 4.5 | 2.0 | 7.7 | 3.4 | 6.3 | 3.1 | 5.3 | 2.8 |
| $CeF_4$ | | | | | | | 3.6 | 1.4 | | | | | | |
| $ThF_4$ | | | | | | | 4.5 | 1.3 | | | | | | |
| $AlF_3$ | 15.5 | 15.7 | 15.7 | 16.4 | 14.5 | 16.5 | 18.0 | 19.0 | 14.6 | 15.0 | 12.4 | 14.3 | 10.5 | 13.0 |
| $BeF_2$ | 22.9 | 41.5 | 21.6 | 40.3 | 18.3 | 36.9 | 19.8 | 35.8 | 21.5 | 40.2 | 16.9 | 34.6 | 14.5 | 32.1 |
| $Al(PO_3)_3$ | 8.5 | 2.7 | 10.0 | 3.3 | 18.2 | 6.5 | | | | | | | | |
| $PbO$ | | | | | | | | | | | | | 24.0 | 11.3 |
| $P_2O_5$ | | | | | | | 6.0 | 3.6 | 8.4 | 5.1 | 17.4 | 11.8 | 16.0 | 11.8 |
| $La_2O_3$ | | | | | | | 4.0 | 1.0 | 5.6 | 1.5 | 11.6 | 3.5 | | |
| $n_D$ | 1.4183 | | 1.4222 | | 1.4321 | | 1.4140 | | 1.4267 | | 1.4673 | | 1.5140 | |

TABLE IX

|  | 48 | | 49 | |
|---|---|---|---|---|
|  | W | M | W | M |
| $MgF_2$ | 10.8 | 14.1 | 12 | 14.8 |
| $CaF_2$ | 11.7 | 12.3 | 12 | 11.8 |
| $SrF_2$ | 7.2 | 4.7 | 7 | 4.3 |
| $BaF_2$ | 9.9 | 4.6 | 10 | 4.4 |
| $LaF_3$ | 4.5 | 2.0 | 4 | 1.6 |
| $CeF_4$ | 3.6 | 1.4 | 4 | 1.4 |
| $ThF_4$ | 4.5 | 1.2 | 4 | 1.0 |
| $AlF_3$ | 18.0 | 17.5 | 19 | 17.4 |
| $BeF_2$ | 19.8 | 34.5 | 21 | 34.3 |
| $BaSO_4$ | 10.0 | 7.7 | | |
| $NaCl$ | | | 7 | 9.2 |
| $n_D$ | 1.4021 | | 1.3839 | |

TABLE II-A

*Ionic percentages*

|  | 6 | 7 | 8 |
|---|---|---|---|
| $Mg^{++}$ | 5.08 | 4.30 | 2.80 |
| $Ca^{++}$ | 4.37 | 3.42 | 3.00 |
| $Sr^{++}$ | 1.57 | 2.15 | 1.17 |
| $Ba^{++}$ | 1.66 | 1.55 | 1.49 |
| $La^{+++}$ | 0.62 | 2.18 | 1.20 |
| $Th^{++++}$ | 0.49 | 0.60 | 3.09 |
| $Al^{+++}$ | 6.09 | 6.12 | 6.60 |
| $Be^{++}$ | 10.89 | 9.73 | 9.32 |
| $F^-$ | 69.23 | 69.64 | 71.33 |

TABLE III-A

*Ionic percentages*

|  | 9 | 10 | 11 | 12 | 13 | 14 | 15 | 16 | 17 | 18 |
|---|---|---|---|---|---|---|---|---|---|---|
| $Mg^{++}$ | 4.71 | 4.59 | 4.75 | 4.79 | 4.86 | 4.28 | 4.59 | 5.03 | 4.76 | 4.23 |
| $Ca^{++}$ | 4.06 | 3.97 | 4.10 | 2.55 | 5.36 | 3.73 | 7.65 | 0.66 | 0.60 | 3.37 |
| $Sr^{++}$ | 1.56 | 1.51 | 1.57 | 2.18 | 0.93 | 1.43 | 0.31 | 6.68 | 0.60 | 2.10 |
| $Ba^{++}$ | 1.53 | 1.48 | 1.54 | 1.70 | 0.66 | 1.39 | 0.31 | 0.66 | 6.55 | 1.51 |
| $La^{+++}$ | 0.61 | 0.62 | 0.63 | 0.63 | 0.48 | 0.58 | 0.31 | 0.66 | 0.60 | |
| $Ce^{++++}$ | 0.46 | 0.44 | 0.46 | 0.51 | 0.47 | 0.42 | 0.46 | 0.51 | 0.30 | 1.95 |
| $Th^{++++}$ | 0.40 | 0.38 | 0.40 | 0.40 | 0.45 | 0.36 | 0.46 | 0.51 | 0.60 | 0.59 |
| $Al^{+++}$ | 5.81 | 5.98 | 6.46 | 6.22 | 6.10 | 6.88 | 6.12 | 7.01 | 8.33 | 6.26 |
| $Be^{++}$ | 11.43 | 10.62 | 10.49 | 11.63 | 11.38 | 11.25 | 10.40 | 8.37 | 7.44 | 9.54 |
| $F^-$ | 69.44 | 70.41 | 69.60 | 69.39 | 69.31 | 68.68 | 69.42 | 69.91 | 70.24 | 70.45 |

Certain of the above examples are repeated below, the same examples being designated by the same characters with the proportions being given as percentages of ions or atoms of each element. These may be called the ionic, atomic, or elemental percentages. We shall here use the term "ionic percentages." The corresponding tables are designated respectively I-A to IX-A. In using "ionic percentage." The corresponding tables age," however, we do not wish to imply that the binding forces between adjacent atoms are necessarily purely ionic in character.

TABLE IV-A

*Ionic percentages*

|  | 19 | 20 | 21 | 22 | 23 | 24 |
|---|---|---|---|---|---|---|
| $Mg^{++}$ | 3.17 | 3.48 | 4.01 | 3.89 | 3.72 | 3.94 |
| $Ca^{++}$ | 3.27 | 3.18 | 4.16 | 3.89 | 3.72 | 3.03 |
| $Sr^{++}$ | 1.13 | 1.23 | 1.39 | 1.29 | 1.24 | 0.61 |
| $Ba^{++}$ | 2.42 | 1.76 | 1.28 | 1.16 | 1.24 | 0.61 |
| $Pb^{++}$ | | 3.79 | 0.92 | 0.87 | 0.93 | 0.91 |
| $La^{+++}$ | 3.02 | 1.26 | 1.15 | 1.04 | 1.24 | 0.61 |
| $Ce^{++++}$ | | | | | | 0.61 |
| $Th^{++++}$ | | | | | 0.62 | 0.61 |
| $Al^{+++}$ | 5.75 | 6.26 | 5.06 | 6.74 | 4.64 | 6.06 |
| $Be^{++}$ | 12.66 | 9.86 | 13.29 | 11.88 | 13.62 | 13.33 |
| $F^-$ | 68.58 | 69.17 | 68.74 | 69.24 | 69.04 | 69.70 |

TABLE V-A

*Ionic percentages*

|  | 25 | 26 | 27 | 28 | 29 |
|---|---|---|---|---|---|
| $Mg^{++}$ | 4.17 | 4.18 | 4.19 | 4.19 | 4.76 |
| $Ca^{++}$ | 2.72 | 2.67 | 2.67 | 2.67 | 4.12 |
| $Sr^{++}$ | 1.89 | 1.88 | 1.88 | 1.88 | 1.57 |
| $Ba^{++}$ | 1.62 | 1.79 | 1.79 | 1.79 | 1.69 |
| $La^{+++}$ | | | | | 0.50 |
| $Y^{+++}$ | 1.45 | | | | |
| $Pr^{+++}$ | | 2.12 | | | |
| $Nd^{+++}$ | | | 2.06 | | |
| $Sm^{+++}$ | | | | 2.03 | |
| $Bi^{+++}$ | | | | | 0.93 |
| $Th^{++++}$ | 0.38 | 0.42 | 0.42 | 0.42 | |
| $Al^{+++}$ | 6.20 | 6.18 | 6.19 | 6.22 | 5.00 |
| $Be^{++}$ | 11.11 | 11.05 | 11.10 | 11.11 | 12.61 |
| $F^-$ | 70.46 | 69.72 | 69.70 | 69.70 | 68.81 |

TABLE I-A

*Ionic percentages*

|  | 1 | 2 | 3 | 4 | 5 |
|---|---|---|---|---|---|
| $Mg^{++}$ | 4.65 | 5.05 | 4.73 | 4.43 | 4.54 |
| $Ca^{++}$ | 4.65 | 4.33 | 4.43 | 3.82 | 3.63 |
| $Sr^{++}$ | 1.54 | 1.53 | 1.77 | 1.29 | 2.27 |
| $Ba^{++}$ | 1.39 | 1.38 | 1.41 | 1.05 | 1.62 |
| $La^{+++}$ | 1.24 | 1.23 | 1.38 | 0.93 | 1.43 |
| $Al^{+++}$ | 8.06 | 8.39 | 8.83 | 8.76 | 1.39 |
| $Be^{++}$ | 8.75 | 8.21 | 7.37 | 9.81 | 17.53 |
| $F^-$ | 69.82 | 69.93 | 70.05 | 69.90 | 67.61 |

TABLE VI-A

*Ionic percentages*

|   | 30 | 31 | 32 | 33 | 34 | 35 | 36 |
|---|---|---|---|---|---|---|---|
| $Mg^{++}$ | 6.57 | 4.70 |  | 5.21 | 5.87 | 5.42 | 4.68 |
| $Ca^{++}$ |  | 4.61 | 6.12 |  | 3.09 | 3.69 | 4.59 |
| $Sr^{++}$ |  |  | 2.02 | 2.58 |  |  | 1.79 |
| $Ba^{++}$ | 7.01 |  | 2.14 | 2.70 | 4.20 | 3.56 |  |
| $La^{+++}$ |  | 2.34 | 1.28 | 1.13 |  |  | 1.25 |
| $Al^{+++}$ | 7.13 | 7.76 | 7.49 | 6.84 | 7.26 | 8.59 | 7.24 |
| $Be^{++}$ | 10.43 | 10.55 | 11.25 | 12.21 | 10.50 | 9.20 | 10.95 |
| $F^-$ | 68.86 | 70.03 | 69.39 | 69.33 | 69.09 | 69.53 | 69.50 |

TABLE VII-A

*Ionic percentages*

|   | 37 | 38 | 39 | 40 |
|---|---|---|---|---|
| $Li^+$ |  | 4.05 |  |  |
| $Na^+$ |  |  | 4.60 |  |
| $K^+$ | 9.25 |  |  | 5.84 |
| $Ca^{++}$ | 1.39 | 2.70 | 3.05 | 2.91 |
| $La^{+++}$ | 2.21 | 2.35 | 2.19 | 2.32 |
| $Al^{+++}$ |  | 7.53 | 7.17 | 6.75 |
| $Be^{++}$ | 22.86 | 14.75 | 14.73 | 14.43 |
| $F^-$ | 64.29 | 68.61 | 68.25 | 67.74 |

TABLE VIII-A

*Ionic percentages*

|   | 41 | 42 | 43 | 44 | 45 | 46 | 47 |
|---|---|---|---|---|---|---|---|
| $Mg^{++}$ | 3.62 | 3.46 | 3.19 | 4.29 | 3.51 | 2.85 | 2.76 |
| $Ca^{++}$ | 3.46 | 3.34 | 3.05 | 3.71 | 3.36 | 2.78 | 2.66 |
| $Sr^{++}$ | 1.43 | 1.38 | 1.27 | 1.42 | 1.40 | 1.15 | 1.11 |
| $Ba^{++}$ | 1.14 | 1.12 | 1.02 | 1.40 | 1.11 | 0.94 | 0.89 |
| $Pb^{++}$ | 0.92 | 1.06 | 0.97 |  | 0.89 | 0.88 | 4.03 |
| $La^{+++}$ | 1.02 | 1.00 | 0.92 | 1.18 | 1.87 | 2.70 | 0.80 |
| $Ce^{+++}$ |  |  |  | 0.41 |  |  |  |
| $Th^{++++}$ |  |  |  | 0.36 |  |  |  |
| $Al^{+++}$ | 5.32 | 5.58 | 5.94 | 5.31 | 4.41 | 3.86 | 3.70 |
| $Be^{++}$ | 11.94 | 11.39 | 9.58 | 10.43 | 11.62 | 9.40 | 9.14 |
| $P^{+++++}$ | 2.38 | 2.82 | 5.09 | 2.10 | 3.01 | 6.44 | 6.68 |
| $O^{--}$ | 7.13 | 8.46 | 15.27 | 6.15 | 8.83 | 18.90 | 19.88 |
| $F^-$ | 61.65 | 60.40 | 53.68 | 63.24 | 60.00 | 50.10 | 48.34 |

TABLE IX-A

*Ionic percentages*

|   | 48 | 49 |
|---|---|---|
| $Na^+$ |  | 2.92 |
| $Mg^{++}$ | 4.40 | 4.70 |
| $Ca^{++}$ | 3.81 | 3.75 |
| $Sr^{++}$ | 1.46 | 1.36 |
| $Ba^{++}$ | 2.53 | 1.39 |
| $La^{+++}$ | 0.58 | 0.50 |
| $Ce^{+++}$ | 0.42 | 0.45 |
| $Th^{++++}$ | 0.37 | 0.32 |
| $Al^{+++}$ | 5.45 | 5.52 |
| $Be^{++}$ | 10.70 | 10.89 |
| $S^{6+}$ | 1.08 |  |
| $O^{--}$ | 4.33 |  |
| $F^-$ | 64.87 | 65.29 |
| $Cl^-$ |  | 2.92 |

We have found in general that a batch containing beryllium and aluminum fluorides in an amount at least 25 per cent by weight of the batch and 50 mole per cent of the batch and also including predominantly and in varying proportions the fluorides of the divalent metals, and usually lanthanum fluoride, yields a satisfactory glass. Examples are given in Table I. All of these include the insoluble fluorides of magnesium, calcium, strontium, barium, and lanthanum.

In Table II are given examples including the same fluorides and also thorium fluoride. In Table III are given examples including thorium and cerium fluorides in addition to the fluorides of Table II. Where $CeF_4$ is given in this and other tables, $CeF_3$ may be substituted, since the cerium may be reduced to the cerous state anyway in the process of formation of the glass. In Table IV are given examples including divalent lead fluoride in addition to the different combinations of fluorides of Tables I to III.

In Table V are given examples including insoluble fluorides of trivalent elements in addition to the fluorides as combined in the previous examples.

In all of the examples in Tables I to V the fluorides of all of magnesium, calcium, strontium, and barium are included. That no one of these is essential is demonstrated in the examples given in Table VI, all of which have yielded satisfactory glasses.

It is to be noted that in most of the examples given in Tables I to VI there are present (a) magnesium fluoride, (b) one or more of calcium, strontium, and barium fluorides totaling over 13 mole per cent, (c) one or more of lanthanum, cerium, and thorium fluorides totaling over 3 mole per cent, (d) aluminum fluoride, and (e) beryllium fluoride, the last two totaling over 40 mole per cent.

While in the preferred embodiments of our inventions no alkali metal fluorides are included, they may nevertheless be incorporated to a limited extent, examples of formulae yielding usable glasses being given in Table VII. It is further to be noted that in Example 37, aluminum fluoride is omitted, showing that it is not an essential ingredient.

Tables VIII and IX contain respectively examples illustrative of the addition of phosphates and of sulfate and chlorides, the fluorides, however, being predominant.

In general, although a glass may be formed from a batch containing various components, these individual components do not exist as such in the final product. It is more nearly correct to consider a glass as an irregular aggregate of positive and negative ions ($Na^+$, $Be^{++}$, $Ca^{++}$, $B^{+++}$, $Si^{4+}$, $F^-$, $O^{--}$, etc.) although the forces between adjacent atoms, especially between adjacent silicon and oxygen atoms, are by no means purely ionic in character. For this reason, the "ionic percentages" used in Tables I-A to IX-A are more significant than the weight percentages and mole percentages used in Tables I to IX.

In expressing the compositions in terms of simple fluorides (or oxides, etc.), we do not imply that these simple compounds are necessarily originally used in the actual batches. Complex fluorides, oxides, fluor-oxides, etc. (including those, such as ammonium beryllium fluoride, which decompose on heating to give, besides the components desired, other compounds which are removed by volatilization), may be used in such proportions as to give the desired final composition. Wholly volatile fluorides, such as ammonium fluoride, ammonium hydrogen fluoride, etc., may be added without materially affecting the final composition. Moreover, in a glass consisting of a number of components, the same final composition can be arrived at in various ways, by using different combinations of the same or different compounds in the batch. We do not wish to restrict our claims to any particular combination of compounds used in the batch. For instance, Examples 41 to 43 were made using, in addition to various fluorides, aluminum metaphosphate. Identical glasses might have been made, however, using appropriate amounts of phosphates of other elements (Be, Mg, Ca, Sr, Ba, $Pb_{II}$, La, Ce, and Th), introducing the aluminum as aluminum fluoride. One might also produce these glasses, using no phosphate at all in the batch, but instead, appropriate amounts of a complex fluoride or oxyfluoride of pentavalent phosphorus, with oxides of some of the other elements to be in the glass product. (In such cases as these, the advantage of expressing compositions in terms of the relative amounts of the ions is obvious.)

It is to be noted that the amount of beryllium fluoride present in pure fluoride-glasses can be reduced to about 12 weight per cent or 25 mole per cent as shown in Example 17. We have obtained such glasses in which the sum of the weight percentages of beryllium fluoride and aluminum fluoride is as low as 32 (Example 20) and in which the sum of the mole percentages is only 51 (Example 16). Although aluminum fluoride is not absolutely necessary, as indicated in Example 37, its presence reduces the amount of beryllium fluoride required and thus increases the moisture resistance of the glass.

The ionic percentage of fluorine, in all of our examples which contain no oxygen or chlorine, is between 64 and 72. In the glasses containing oxygen or chlorine in addition to fluorine, the sum of the ionic percentages of fluorine and oxygen or chlorine also falls within this range. The highest ionic percentage of oxygen in these glasses is about 20 per cent of the whole or 40 per cent of the fluorine ions in the same batch.

Although we definitely prefer not to use alkali metal fluoride or other soluble fluorides, it is possible to make glasses which resist attack by moisture fairly well from batches containing some lithium-, sodium-, or potassium-fluoride, as shown in Examples 37 to 40. These glasses can be polished satisfactorily and have remained apparently unattacked after a half-year under ordinary atmospheric conditions. In general, batches are melted in a covered platinum crucible or beaker at a temperature between about 750 and 1100° C. It is not necessary to introduce all batch components at one time. The fluorides are ground to a fine powder and dried completely before being added to the batch. Usually a very clear and mobile liquid results after 5 to 60 minutes' heating, depending on the batch composition, the temperature, and the size of the melt, which varies from 10 to 700 grams. The liquid is shaken, cooled somewhat, and poured into a stainless steel mold at about 300° C. The glass is cooled down slowly in a cooling oven to avoid breakage. Otherwise, no special attempt has been made to anneal the glass.

The glasses listed are all transparent and colorless, except those that contain $Pr^{+++}$, $Nd^{+++}$ and $Sm^{+++}$ (Examples 26, 27 and 28), which are yellowish-green, pink and pale amber, respectively. In borate glasses, a minute amount of cerium is likely to introduce color, but this is not the case in pure fluoride glasses. The glass of Example 18, containing 16 weight per cent $CeF_4$, prepared from $(NH_4)_2Ce(NO_3)_6$, is colorless, even though it cuts off ultraviolet radiation at relatively long wavelengths. In this and similar glasses, the cerium may perhaps be in the cerous state, since cerous fluoride is said to be produced from ceric fluoride by heating the latter to a dull red heat. When in the claims we refer to a glass as "transparent," we mean that it is clear and transmits light without objectionable diffusion even though it absorbs visible or invisible light.

The optical properties of these fluoride glasses are unique and valuable and are given for certain glasses in Table X. The refractive indices of our pure fluoride glasses lie between about 1.34 and 1.44, lower than those of any commercial glasses known to us. We believe that glasses, of similar composition to those cited, but with even lower refractive indices, can be obtained. The extremely high Abbé values, above 95 (low dispersions), of these glasses have not been matched, to our knowledge, by any oxide glasses.

As elsewhere pointed out, the presence of cerium, praseodymium and neodymium materially reduces the transmission in the invisible portions of the spectrum.

TABLE X

*Optical properties*

|  | 1 | 2 | 9 | 10 | 11 | 28 | 36 | 41 | 42 | 45 | 47 | 48 |
|---|---|---|---|---|---|---|---|---|---|---|---|---|
| $n_D$ | 1.3892 | 1.3924 | 1.3822 | 1.3838 | 1.3875 | 1.3879 | 1.3718 | 1.4183 | 1.4222 | 1.4267 | 1.5140 | 1.4021 |
| $\nu$ | 100.2 | 99.5 | 100.5 | 100.4 | 99.1 | 99.1 | 102.6 | 82.0 | 81.0 | 82.3 | 56 | 95.3 |
| $n_F - n_C$ | 0.00388 | 0.00394 | 0.00381 | 0.00383 | 0.00391 | 0.00391 | 0.00362 | 0.00512 | 0.00521 | 0.00519 | 0.00920 | 0.00422 |
| $n_F - n_D$ | .00271 | .00276 | .00265 | .00266 | .00273 | .00272 | .00253 | .00359 | .00365 | .00363 | .00651 | .00296 |
| $n_e - n_C$ | .00215 | .00218 | .00210 | .00211 | .00215 | .00215 | .00200 | .00281 | .00284 | .00284 | .00497 |  |
| $n_g - n_F$ | .00205 | .00206 | .00201 | .00200 | .00204 | .00205 | .00189 | .00270 | .00280 | .00278 | .00512 | .00221 |
| $n_h - n_g$ | .00167 |  | .00164 | .00163 | .00167 | .00168 | .00153 |  | .00233 | .00230 |  |  |
| $n_D - n_{A'}$ | .00258 |  | .00259 | .00257 | .00259 |  |  |  |  |  |  |  |
| $\nu_{gF}$ | 0.528 | 0.523 | 0.528 | 0.522 | 0.522 | 0.524 | 0.522 | 0.527 | 0.537 | 0.536 | 0.557 | 0.524 |
| $\nu_{FA'}$ | 1.363 |  | 1.375 | 1.366 | 1.361 |  |  |  |  |  |  |  |

It is to be noted that the presence of oxygen ions, whether as oxides, phosphates, sulphates, or in other forms, increases the index of refraction and decreases the Abbé value. In general fluorides are compatible with oxides and combinations of the two yield useful glasses. Our glasses of this sort, containing large proportions of fluorides, must be distinguished from many hitherto known glasses in the manufacture of which relatively small amounts of fluorides are added, but from which the fluorine is largely or completely volatilized during melting at the high temperatures at which such glasses are made. It will be seen that the presence of the fluorides predominantly in any glass of various types where they are compatible with the other ingredients adds to the utility of glasses of such types.

From the examples given, it is to be noted that the fluorides of the five bivalent elements—magnesium, calcium, strontium, barium and lead, particularly the first four—are present in many instances in varying proportions, totalling from 5 to 62 per cent by weight or from 3 to 44 mole per cent and that the lanthanum, cerium and thorium fluorides may be present in quantities up to 8, 7 and 11 mole per cent respectively. It is to be noted that a given mole per cent of a fluoride of a heavy element, such as lead or thorium, corresponds to a considerably larger weight per cent, when the other elements present are relatively light.

Precise limits of the quantities of the various fluorides mentioned that may be usefully employed cannot be stated in general terms. The quantities which may be used are dependent largely on such factors as the number, amount and proportions of ingredients present, the thermal history during both melting and cooling processes, the size of the melt and of the mold, and the like.

Generally speaking, good glasses are not obtained unless at least moderately strong interatomic bonds—such as those between beryllium and fluorine—form an irregular three-dimensional network. For this, the ratios of the number of fluorine atoms to the number of atoms of other elements, such as beryllium, which form strong bonds to fluorine must not be too large. Since incorporation into a glass of a fluoride of a trivalent element furnishes three fluorine atoms for every atom of the trivalent element, large relative proportions, in moles, of such elements can not be introduced. (A similar statement applies to fluorides of tetravalent elements, such as thorium.) On the other hand, even moderate proportions of fluorides of monovalent elements make a glass relatively soluble in water and so unstable to attack by atmospheric moisture. The presence of such fluorides also tends to increase the mobility of the ions in a glass and so facilitates devitrification. For these reasons, most of the satisfactory glasses which we have made contain primarily bivalent, trivalent and tetravalent elements, with the molal proportions of the last two relatively small.

Fluorides of the heavy elements, lead, bismuth, thorium, lanthanum, cerium, and other rare earth elements, are sometimes especially useful components because they tend to give a glass of high refractive index.

As noted above, the proportions given are by way of example. The structure of a glass is extremely complex, and this is of course increasingly so the greater the number of ingredients, making it practically impossible in a reasonable time to obtain "equilibrium" diagrams showing the exact limits of the amounts of each fluoride that may be present in the numerous possible combinations. In general, the presence of a considerable number of different fluorides, as in most of the examples, is preferable to the use of a few, since this reduces the tendency to crystallization or phase separation.

Fluoride glasses made from batches containing fluorides of beryllium, magnesium, calcium, strontium, barium, aluminum, and lanthanum show high transmission extending further into the ultraviolet than any known glass except vitreous silica and beryllium fluoride. The glass of Example 1, for instance, begins to transmit at about 1840 Å. and has 95 per cent transmission at about 2900 Å. Its transmission extends through the entire visible spectrum into the infrared to about 54,000 Å. Glasses containing $PrF_3$ and $NdF_3$ also transmit ultraviolet down to about 2130 Å., even though they have absorption bands in the visible and near visible in the ultraviolet region. We believe that the transmission curves of the fluoride glasses can be pushed still further toward shorter wavelengths by purification of the raw materials. The raw materials used by us are commercially available products, which we have not further purified. It is to be noted that the colored fluoride glasses made by incorporating $PrF_3$ and $NdF_3$ yield characteristic absorption bands in the visible region similar to those of the corresponding oxide glasses.

To summarize, we have discovered that a glass having new and useful optical properties, that is weather-resistant, transparent and colorless, that transmits light throughout the visible spectrum and far into the ultraviolet and infrared regions, may be made entirely of fluorides, particularly if beryllium fluoride, or beryllium and aluminum fluorides, are present in an amount totalling at least 32 per cent by weight or 51 mole per cent, the aluminum and beryllium totalling at least 14 ionic per cent, and if alkali metals, if present, do not exceed 10 ionic per cent; and that many of the above valuable properties are present if other negative ions than fluorine are present, provided that the ionic percentage of fluorine present is at least 48 per cent.

When in the claims I refer to "fluoride selected from the fluorides," etc., I do not mean "a fluoride," but I use the word "fluoride" collectively to include one or more fluorides selected from the designated group.

From the numerous examples given, it is apparent that numerous variations, modifications and equivalents are possible and we consider our invention to include all such as fairly fall within the scope of the appended claims.

We claim:

1. An optical glass resulting from fusion of a batch consisting of fluorides and containing 64 to 72 ionic per cent fluorine, at least 7 ionic per cent beryllium and the following in amounts not exceeding that indicated in ionic per cent: 8 magnesium, 8 calcium, 7 strontium, 8 barium, 10 aluminum.

2. An optical glass resulting from fusion of a batch consisting of fluorides and containing 64 to 72 ionic per cent fluorine, at least 7 ionic per cent beryllium and the following in amounts not exceeding that indicated in ionic per cent: 8 magnesium, 8 calcium, 7 strontium, 8 barium, 10 aluminum, 4 lanthanum.

3. A moisture-insusceptible, transparent, colorless fluoride glass resulting from fusion of a batch consisting of compounds compatible in a glass composition and containing the following fluorides in the percentages by weight given: Magnesium 6 to 13 per cent; calcium 1.5 to 27 per cent; strontium 1.5 to 32 per cent; barium 2 to 39 per cent; lanthanum 2.5 to 6 per cent; cerium 2 to 5 per cent; thorium 4 to 7 per cent; aluminum 15 to 25 per cent; beryllium 12 to 25 per cent, the sum of the beryllium and aluminum fluorides being between 32 and 50 per cent.

4. A moisture-insusceptible, transparent, colorless fluoride glass resulting from fusion of a batch consisting of the following fluorides in the percentages by weight given: Magnesium 9 to 13 per cent; calcium 1.5 to 27 per cent; strontium 1.5 to 32 per cent; barium 2 to 39 per cent; lanthanum 2.5 to 6 per cent; cerium 2 to 5 per cent; thorium 4 to 7 per cent; aluminum 15 to 25 per cent; beryllium 12 to 25 per cent, the sum of the beryllium and aluminum fluorides being between 32 and 50 per cent.

5. A moisture-insusceptible, transparent, colorless fluoride glass transmitting ultraviolet radiation down to about 1840 Å. and resulting from fusion of a batch consisting of the following fluorides in the percentages by weight given: Magnesium 6 to 13 per cent; calcium 6 to 13 per cent; strontium 5 to 10 per cent; barium 9 to 12 per cent; lanthanum 5 to 16 per cent; thorium 4 to 29 per cent; aluminum 15 to 25 per cent; beryllium 12 to 25 per cent, the sum of the beryllium and aluminum fluorides being between 32 and 50 per cent.

6. A moisture-insusceptible, transparent, colorless fluoride glass resulting from fusion of a batch consisting of fluorides and containing the following fluorides in the percentages by weight given: Magnesium 6 to 13 per cent; calcium 1.5 to 27 per cent; strontium 1.5 to 32 per cent; barium 2 to 39 per cent; lanthanum 2.5 to 6 per cent; thorium 4 to 29 per cent; aluminum 15 to 25 per cent; beryllium 12 to 25 per cent, the sum of the beryllium and aluminum fluorides being between 32 and 50 per cent.

7. Glass resulting from fusion of a batch consisting of fluorides and containing the fluorides of the following metals in the mole percentages given: beryllium and aluminum, totaling at least 50; magnesium, 0 to 22; calcium, 0 to 25; strontium, 0 to 25; barium, 0 to 25; the total of calcium, strontium, and barium fluorides being between 3 and 27; lanthanum, 0 to 8; thorium, 0 to 11; cerium, 0 to 7; the total of lanthanum, thorium, and cerium fluorides being between 0 and 15.

8. A glass resulting from fusion of a batch consisting of fluorides and containing the fluorides of the following metals in the mol percentages given: beryllium and aluminum, totaling at least 50; magnesium, 9 to 22; calcium, 0 to 25; strontium, 0 to 25; barium, 0 to 25; the total of calcium, strontium, and barium fluorides being between 14 and 27; lanthanum, 0 to 8; thorium, 0 to 11; cerium, 0 to 7; the total of lanthanum, thorium and cerium fluorides being between 0 and 15.

9. A glass resulting from fusion of a batch consisting of fluorides and containing the fluorides of the following metals in the mol percentages given: beryllium and aluminum, totaling at least 50; magnesium, 9 to 17; calcium, 2 to 25; strontium, 1 to 25; barium, 1 to 25; the total of calcium, strontium and barium fluorides being between 14 and 27; lanthanum, 0 to 8; thorium, 0 to 11; cerium, 0 to 7; the total of lanthanum, thorium and cerium fluorides being between 3 and 15.

10. A moisture-insusceptible, transparent glass consisting of the fused heat reaction product of a batch consisting of compatible fluorides, and containing beryllium and aluminum fluorides in amounts totalling between 32 and 64 per cent by weight, of which at least 12 per cent is beryllium fluoride, and the following fluorides in amounts not exceeding that indicated in weight per cent: magnesium fluoride, 15 per cent; calcium fluoride, 32 per cent; strontium fluoride, 32 per cent; barium fluoride, 45 per cent; the total of said four last-mentioned fluorides in said batch being between 20 and 60 per cent by weight.

11. An optical glass consisting of the following fluorides in the following percentages by weight: magnesium fluoride, 10 to 15; calcium fluoride, 10 to 15; strontium fluoride, 5 to 12; barium fluoride, 8 to 15; lanthanum fluoride, 5 to 15; beryllium and aluminum fluorides together totalling 39 to 55 per cent, of which at least 12 is beryllium fluoride.

KUAN-HAN SUN.
MAURICE L. HUGGINS.

REFERENCES CITED

The following references are of record in the file of this patent:

UNITED STATES PATENTS

| Number | Name | Date |
|---|---|---|
| 2,038,691 | Taylor | Apr. 28, 1936 |

Certificate of Correction

Patent No. 2,511,224 June 13, 1950

KUAN-HAN SUN ET AL.

It is hereby certified that errors appear in the printed specification of the above numbered patent requiring correction as follows:

Column 5, Table I, line 1 of the first column thereof, for "MfF$_2$" read $MgF_2$; column 7, line 57, for ' "ionic percentage." The corresponding tables' read *ionic formulas and the expression, "ionic percent-*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*